United States Patent Office 2,915,930
Patented Dec. 8, 1959

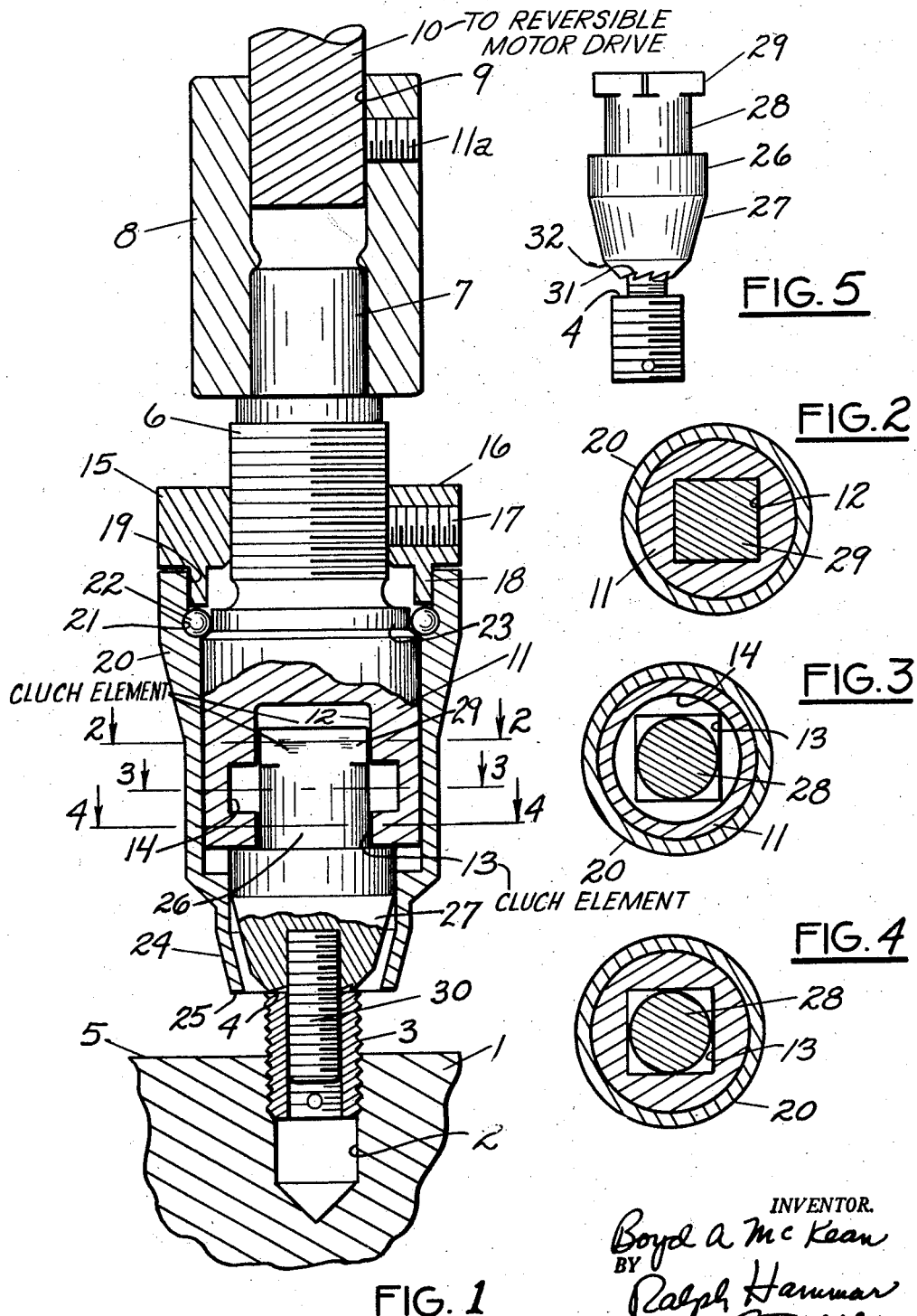

2,915,930

BUSHING OR INSERT DRIVER

Boyd A. McKean, Erie, Pa., assignor to Titan Tool Company, Fairview, Pa., a corporation of Pennsylvania Application June 12, 1958, Serial No. 741,512

3 Claims. (Cl. 81—53)

In aluminum casting such as aircraft engine blocks, tapped steel inserts are used for the cylinder head bolts. These inserts are threaded into the casting and keyed in place in a semi-permanent manner. The inserts usually have to be set flush with or below the surface of the casting so as not to interfere with the seating of the cylinder head.

This invention is a driver for setting the bushings or inserts in which the drive member is alternatively driven by one or the other of two axially spaced positive clutches. One of the clutches applies the driving or setting torque to the bushing. The other clutch unthreads the driver from the bushing. There is a neutral position between the two clutches in which the driver freely rotates and the driver is moved into this neutral position by a gage which likewise is freely rotatable so that it will not mark the surface of the casting.

In the drawing, Fig. 1 is a section through the driver showing the parts in position to drive a bushing into a casting; Figs. 2, 3 and 4 are sections on the correspondingly numbered lines of Fig. 1; and Fig. 5 is a side view of the drive member.

In the drawing, 1 represents a soft metal casting having a hole 2 therein in which is to be threaded a hardened steel bushing or insert 3. The bushing may be a self tapping bushing as illustrated or it may have conventional threads in which case the hole 2 would be tapped. At the end of the driving operation, the upper end face 4 of the bushing will ordinarily be at or slightly below the surface 5 of the casting so as not to interfere with any part which may be clamped against that surface. After driving, the insert is locked in place in the casting and bolts may be threaded into the insert without damaging the casting.

The tool has a driving member 6 with a shank 7 at its upper end fixed to a socket 8 having a non circular recess 9 for receiving a similarly shaped end on a drive shaft 10 of a reversible motor such as used for tapping. The drive socket 8 is locked to the drive shaft by a set screw 11a. At the lower end of the driving member is a head 11 having therein two axially spaced noncircular clutch sections 12 and 13 with a circular section 14 between the two clutch sections. Above the head is a threaded section 15 on which is threaded a collar 16 locked in place by a set screw 17. The collar 16 has a sleeve-like extension 18 telescoped over a reduced section 19 on the head and within the upper end of a tubular gage member 20. The gage member has an internal groove 21 receiving balls 22 which ride on the outer cylindrical surface 23 of the head. When the collar 16 is locked in place, the balls 22 both hold the tubular gage member on the head and provide an anti-friction bearing which permits free rotation of the gage member relative to the head. At the lower end of the gage member is a tapered nose 24 with a smooth work engaging surface 25 which stops movement of the driver toward the casting by engagement with the surface 5 on the casting. The gage member 20 is freely rotatable so that when its surface 25 strikes the casting, the casting is not scratched or marked.

In the driving position, the driving of the inserts is through a clutch member 26 having a head 27 rotatably held within the tapered nose 24 of the gage and having a shank 28 slidably received in the lower end of the head 11. At the upper end of the shank 28 is a square section 29 receivable in either clutch section 12 or 13 in the head or in the circular section 14 between the two clutch sections. When the square section 29 is engaged with either of the clutch sections 12 or 13, the clutch member 26 is positively connected to the head 11 of the driving member 6. When the square section 29 is in the circular section 14 between the two clutch sections 12 and 13, the clutch member 26 is in its neutral position and is freely rotatable relative to the head 11.

In the driving position shown, the square section 29 of the clutch member 26 is received in the upper clutch section 12 establishing a positive and direct driving connection from the motor shaft 10 to the clutch member 26. A drive member 30 fixed in the clutch member is screwed into the internal threads of the bushing 3 until serrations 31 on the tapered lower end 32 of the clutch member contact the upper end of the bushing. When the serrations 31 contact the upper end of the bushing 3 there are two driving forces transmitted to the bushing. The first of these driving forces comes from the serrations 31 which are inclined in the direction to dig slightly into the upper end of the bushing under driving torque in the direction to screw the bushing into the hole 2 and to exert part of the driving torque on the bushing 3. The other driving force is exerted on the bushing 3 between the threads on the drive member 30 and the threads on the bushing when the threads jam. The jamming tendency is not as great as it would be if the serrations 31 were omitted because then the entire bushing driving torque would come from the threads.

The driving of the bushing 3 continues until the lower end 25 of the gage 20 contacts the surface 5 on the casting. At this point, movement of the gage 20 stops and continued turning of the bushing 3 pulls the clutch member 26 downward until its squared end 29 moves out of engagement with the upper clutch surface 12 and into the circular section 14. At this point, the drive to the clutch member is disconnected and the spindle 6 rotates freely within the gage 20 and without further turning of the bushing 3. It will be noted that the tapered end 32 of the clutch member 26 is of lesser diameter than the outside diameter of the bushing 3 so that it can move slightly below the surface 5 of the casting without contacting the casting. This permits the bushing insert 3 to be driven to a position below the surface 5 of the casting as is necessary in aircraft engine blocks and in other applications.

To disengage the driving member from the bushing 3, the tool is lifted thereby moving the squared clutch surface 29 into engagement with the lower clutch 13 and the motor shaft 10 is reversed. This quickly unscrews the drive member 30 from the bushing 3. The ratchet-like serrations 31 face in the wrong direction to exert torque in this direction of rotation and accordingly do not affect the unscrewing of the drive member 30 from the bushing. The unscrewing is further facilitated by the fact that the threaded drive member 30 is not tightly jammed in the internal threads of the bushing 3.

What is claimed as new is:

1. A tool for driving an externally threaded internally tapped bushing or insert into a hole in a structure comprising a driving member for connection to a reversible power drive, the driving member having upper and lower clutch surfaces separated by a neutral or non-driving section, a stop journaled on the driving member having a surface engaging the structure and limiting the movement of the driving member toward the structure, a clutch member having a surface positionable in engagement with either of the clutch surfaces in the driving member or in the neutral section, and a threaded drive member screwed into the internal threads of the bushing, said clutch member surface engaging the upper clutch surface of the driving member in the driving position with the power drive rotating in the direction to screw the bushing into the structure and being pulled downward out of engagement with said upper clutch surface by continued rotation of the driving member after engagement of the stop with the structure, and said clutch member being movable into engagement with said lower clutch surface to rotate it in the reverse direction to unscrew the drive member from the bushing by reversing the power drive and lifting the tool away from the structure.

2. A tool for driving an externally threaded internally tapped bushing or insert into a hole in a structure comprising a reversible power driven member having a threaded section non rotatable relative to the power driven member and screwed into the internal threads of the bushing to develop a driving torque between the threads on the power driven member and the threads on the bushing when the power driven member is turned until the threads jam in the direction to screw the bushing into the structure, all of the threads on the bushing and driving member being of the same direction, and ratchet-like serrations on the power driven member engaging the upper end of a bushing screwed on said threaded section, said serrations being inclined in the direction to grip the bushing and exert a supplementary driving torque thereon when the power driven member is turned in the direction to screw the bushing into the structure and to release the grip on the bushing when the power driven member is turned in the reverse direction to unscrew the threaded section from the bushing.

3. The tool of claim 2 in which the part of the power driven member having the serrations engaging the bushing is a nose of smaller diameter than the bushing whereby it clears the structure into which the bushing is being threaded and prevents marking of the structure.

References Cited in the file of this patent

UNITED STATES PATENTS

| 1,785,847 | Valentine | Dec. 23, 1930 |
| 2,281,164 | Maling | Apr. 28, 1942 |
| 2,622,466 | Vanden Bros. et al. | Dec. 23, 1952 |
| 2,670,644 | Du Sell | Mar. 2, 1954 |
| 2,694,328 | La Freniere | Nov. 16, 1954 |
| 2,719,445 | Giebler | Oct. 4, 1955 |

FOREIGN PATENTS

| 125,298 | Great Britain | Apr. 17, 1919 |
| 695,021 | Great Britain | Aug. 5, 1953 |